United States Patent [19]
Pinnau et al.

[11] Patent Number: 5,630,970
[45] Date of Patent: May 20, 1997

[54] PROCESS FOR RESTORING MEMBRANE PERMEATION PROPERTIES

[75] Inventors: Ingo Pinnau, Palo Alto; Lora G. Toy, San Francisco; Carlos G. Casillas, San Jose, all of Calif.

[73] Assignee: Membrane Technology and Research, Inc., Menlo Park, Calif.

[21] Appl. No.: 448,652

[22] Filed: May 24, 1995

[51] Int. Cl.$^6$ .................................................. B29C 71/00
[52] U.S. Cl. ........................................ 264/83; 264/340
[58] Field of Search ................................. 264/83, 340

[56] References Cited

U.S. PATENT DOCUMENTS 5,281,255  1/1994  Toy et al. ............................ 95/50

OTHER PUBLICATIONS

Yampol'skii et al., "Transport Characteristics and Other Physicochemical Properties of Aged Poly(1-(trimethyl)-1-propyne)" Jour. of Polymer Sci. 48, pp. 1935–1944. (1993).

Odani et al., "Design of Polymer Membranes for Gas Separation" in *Polymers for Gas Separation*, pp. 132–135, N. Toshima(Ed.), New York, (1992).

Nakagawa, T. et al. "Polyacetylene Derivatives as Membranes for Gas Separation", *Gas Separation & Purification*, vol. 2 (1988), pp. 3–8.

*Primary Examiner*—Leo B. Tentoni
*Attorney, Agent, or Firm*—J. Farrant

[57] ABSTRACT

A process for restoring the selectivity of high-flee-volume, glassy polymer membranes for condensable components over less-condensable components or non-condensable components of a gas mixture. The process involves exposing the membrane to suitable sorbent vapor, such as propane or butane, thereby reopening the microvoids that make up the free volume. The selectivity of an aged membrane may be restored to 70–100% of its original value. The selectivity of a membrane which is known to age over time can also be maintained by keeping the membrane in a vapor environment when it is not in use.

33 Claims, 8 Drawing Sheets

PROCESS FOR RESTORING MEMBRANE PERMEATION PROPERTIES

This invention was made in part with Government support under Contract Numbers DE-FG03-90ER81066 and DE-FG03-94ER81811, awarded by the Department of Energy. The Government has certain rights in this invention.

FIELD OF THE INVENTION

The invention relates to membrane-based gas-separation processes. More particularly, the invention provides a method for maintaining or restoring the permeation properties of membranes, especially the selectivity of high flee-volume, glassy polymer membranes.

BACKGROUND OF THE INVENTION

The optimum separation membrane for use in any gas separation combines high selectivity with high flux. Thus the membrane industry has engaged in an ongoing quest for membranes with improved flux/selectivity performance.

In recent years, some polymer materials with unusually high permeabilities have been synthesized. Perhaps the best known of these, and representative of the class, is polytrimethylsilylpropyne (PTMSP), a polymer synthesized by T. Masuda et al. in Japan. Although PTMSP is glassy, up to at least about 200° C., it exhibits an oxygen permeability of 10,000 Barrer or above, more than 15 times higher than that of silicone rubber, previously the most permeable polymer known. The selectivity for oxygen/nitrogen, however, is low (1.4–1.8). The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide. These pure-gas data suggest that PTMSP will exhibit poor selectivity for most gas separations.

Thus the material was characterized, at least initially, as of great academic interest, because of its extraordinary permeability, but exhibiting selectivities too low for commercial use. Later, however, it was found that the measured actual mixed-gas selectivity for more condensable organic compounds over less condensable organic compounds or inorganic compounds is dramatically better than the calculation from the pure gas permeabilities would suggest, and that useful processes for separating condensable components from gas streams using glassy high-free-volume polymers are possible. Such processes are disclosed in U.S. Pat. No. 5,281,255, which is incorporated herein by reference in its entirety.

An issue that has concerned all workers with these glassy, high-free-volume materials is stability. Many reports that the permeation properties of PTMSP appear to be unstable over time have been published. For example, Masuda et al. found that the oxygen permeability fell to about 1% of its original value when the membrane was left at room temperature for several months. Odani et al. found that the butane permeability fell by about two orders of magnitude when the material was stored under vacuum at 30° C. for 100 days.

The consensus of opinion in the art has been that the loss in permeability arises from physical aging, producing a gradual loss of free volume, and/or sorption of organic vapors into the high free volume of the polymer. For example, a paper by T. Nakagawa et al. ("Polyacetylene derivatives as membranes for gas separation", Gas Separation and Purification, Vol. 2, pages 3–8, 1988) states that "the reason for unstable gas permeability is the adsorption of volatile materials existing in the atmosphere."

As far as separation of non-condensable gases is concerned, the loss of permeability over time is accompanied by an increase in selectivity. On the other hand, for separation of condensable from non-condensable components, the aging effect causes not only a loss in permeability, but, which is more important, a serious loss of selectivity for the condensable over the non-condensable component.

SUMMARY OF THE INVENTION

The invention has two aspects. In one aspect, the invention is a process for restoring the condensable component selectivity of a glassy, high-free volume membrane when that selectivity has deteriorated. In another aspect, the invention is a process for preventing such deterioration.

Unexpectedly, and contrary to the teachings of Nakagawa et al. cited above, we have found that the separation properties of glassy, high-free-volume polymer membranes are stable, so long as the membrane is maintained in the presence of the right type of vapors. We have found that this effect obtains even at relatively low vapor activities. Additionally, and yet more surprisingly, we have found that lost selectivity can be substantially restored by exposure of the aged membranes to certain vapors.

Thus, in its first aspect, the invention involves introducing membranes that have lost performance, such as during shipping or storage, to a vapor, preferably hydrocarbon vapor. This can be done by placing the membrane in a static atmosphere containing the vapor, or by running a flow of vapor-containing gas across the membrane.

In its second aspect, the invention involves forestalling the aging process by ensuring that, whenever the membrane is not in active use for separating a condensable component from a gas stream, it is maintained in an atmosphere containing a suitable vapor.

The process of the invention is applicable to membranes that have positive selectivity in favor of condensable compounds, especially condensable organic compounds, over air, other gases, or less condensable organic or inorganic vapors. Such membranes often exhibit the following characteristics:

1. Glassy
2. Unusually high free volume within the polymer material
3. Measured mixed gas selectivity is substantially better than calculated pure gas selectivity In particular, the process of the invention is useful for treating the membranes discussed in U.S. Pat. No. 5,281,255, including but not limited to, PTMSP membranes.

The process is applicable regardless of the form of the membranes, which may be homogeneous films, asymmetric membranes, composite membranes, flat sheets, hollow fibers, unhoused or housed in any form of module.

Preferably, the process is carried out using a hydrocarbon vapor to restore or maintain the membrane properties. Conveniently, although not necessarily, the vapor used to restore or maintain the membrane properties may be the same as that which the membrane is used to separate.

The invention offers advantages in that it prolongs the useful lifetime of the membranes and avoids the need for frequent replacement of membranes that have been subject to conditions that damage their properties.

It is an object of the invention to provide a process for restoring, as necessary, the separation properties of glassy polymer membranes that are selective for condensable organic compounds over other components of a gas stream.

It is an object of the invention to provide a process for maintaining, as necessary, the separation properties of glassy polymer membranes that are selective for condensable organic compounds over other components of a gas stream.

It is an object of the invention to provide a process that allows glassy polymer membranes that are selective for condensable organic compounds over other components of a gas stream to be more useful in gas separations, and for longer periods of time, than was previously possible.

It is to be understood that the above summary and the following detailed description are intended to explain and illustrate the invention without restricting its scope.

DETAILED DESCRIPTION OF THE INVENTION

Figure 1:
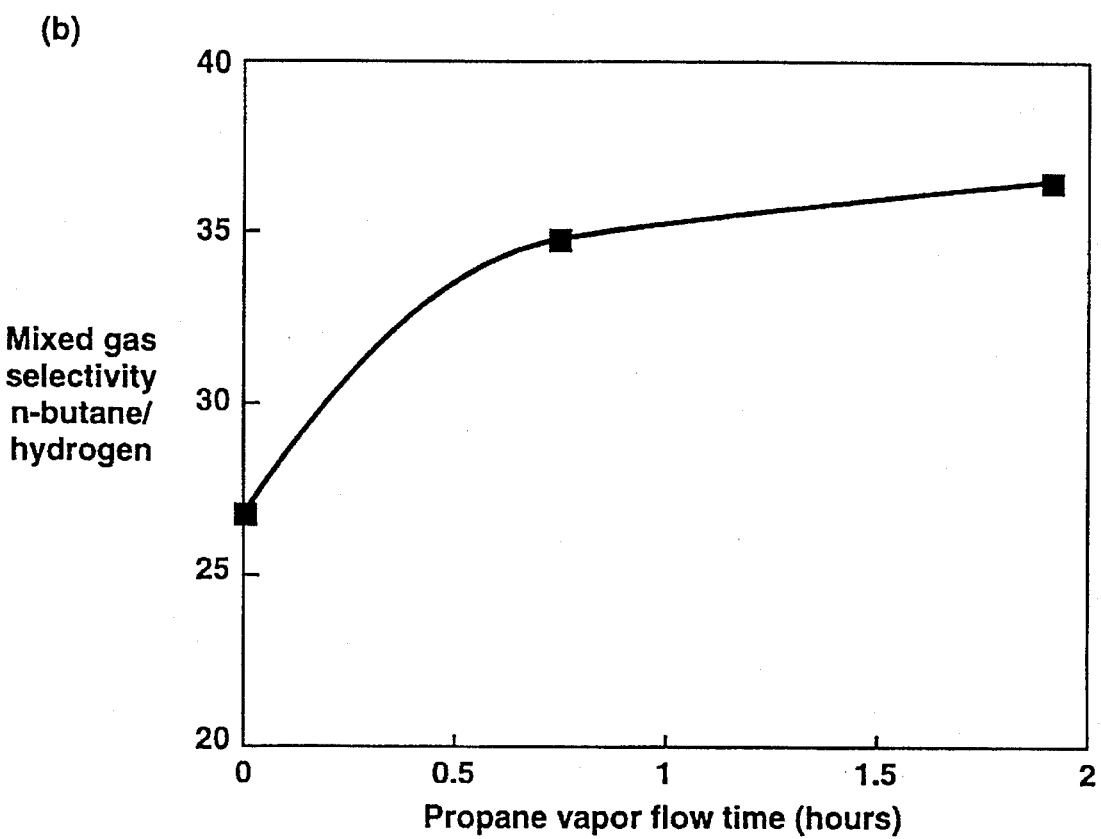
FIG. 1 is a graph of n-butane/hydrogen mixed-gas selectivity as a function of propane treatment time.

The term selectivity as used herein means, unless otherwise qualified, the selectivity of a membrane as measured with a gas mixture containing at least the two components to which the selectivity refers.

The term condensable as used herein refers to fluids below their critical temperatures, having boiling points greater than −100° C. at atmospheric pressure. Between two condensable fluids, the terms condensable or more condensable mean the one having the higher boiling point.

The term gas as used herein means a gas or vapor.

The term activity as used herein means the ratio of the partial vapor pressure to the saturation vapor pressure at the same temperature.

The invention is a process for treating membranes. The invention applies to membranes whose permeation properties, that is permeability and selectivity, change over time. In particular, the invention applies to membranes that have positive, but unstable, selectivity in favor of condensable compounds, especially condensable organic compounds, over air, other gases, or less condensable organic or inorganic vapors. Such membranes often exhibit the following characteristics:

1. Glassy: By glassy, we mean having glass transition temperatures $T_g$ at least above 50° C. Typically such membranes have much higher glass transition temperatures, such as above 100° C., 200° C. or higher.
2. Unusually high free volume within the polymer material: By this, we mean having a free volume greater than 10%, and typically higher, such as at least 15%, 20% or 25% or higher, where the free volumes are estimated from vapor solubility data as in W. J. Koros et at., J. Membrane Science, Vol. 2, page 165, 1977.
3. Measured mixed gas selectivity is substantially better than calculated pure gas selectivity: In the gas-separation-membrane art, two types of selectivity are commonly reported. One is the ideal selectivity, which is the calculated ratio of the measured pressure-normalized fluxes of two gases, the fluxes being measured separately, each with a pure gas sample, through a defect-free membrane sample of the same thickness, and being expressed in $cm^3(STP)/cm^2 \cdot s \cdot cmHg$ or other consistent units. The other is the actual or mixed-gas selectivity, measured with a gas mixture containing two or more gases to be separated.

As discussed in the background section above, some polymer materials with high free volume have been found to exhibit a measured actual mixed-gas selectivity, for more condensable organic compounds over less condensable organic compounds or inorganic compounds, that is dramatically better than the calculated pure-gas selectivity.

While we believe that there may be diverse membranes for which the processes of the invention may be useful, we believe that the invention will be particularly valuable in treating membranes that meet the three criteria above. These membranes are described more fully in U.S. Pat. No. 5,281, 255. We believe the invention will be especially useful for PTMSP membranes.

The invention is a process having two aspects: (a) At least partial restoration of lost selectivity, and (b) Maintenance of selectivity.

(a) At least partial restoration of lost selectivity

As stated in the Background of the Invention section above, it is generally known in the art that certain glassy polymers have extraordinarily high permeabilities to pure gases and that these permeabilities appear to be associated with an unusually high free-volume within the polymer material. It is also known that the permeability often diminishes over time. Of course, changes in permeability are likely to give rise to changes in selectivity. As far as permanent gases are concerned, the loss of permeability is often accompanied by a rise in selectivity. As far as separation of a condensable from a non-condensable or less-condensable component, however, the loss of permeability is accompanied by a significant loss of selectivity. This loss of selectivity reduces the performance of the membranes, and may be so severe as to render them unusable in their original context.

Diverse circumstances under which such a loss of permeability and selectivity takes place have been reported in the literature, including storage under vacuum, standing in air, changes of temperature, or exposure to organic materials, such as sealants and lubricants in pumps used in the membrane separation system, or simply present in the atmosphere.

We have confirmed that membranes made from glassy, high-free-volume materials have unstable permeation properties under some conditions. We measured the pure- and mixed-gas permeation properties of such membranes over periods up to two years and found that the fluxes fell to 16% or less of their original value, and for separation of condensable from less- or non-condensable components, the selectivities fell to as low as 50% of their original value. These changes occurred when the membrane samples were stored in sealed containers in air or a permanent gas environment, or were deliberately aged under vacuum.

Without wishing to be bound by any particular theory, we believe, as others have suggested, that the change in properties is attributable mainly to a reduction in the free volume of the polymer. When first formed, the membranes contain an excess of free volume over the equilibrium value; as the membrane ages, the polymer relaxes gradually into a lower energy state characterized by a more compact, denser structure.

Unexpectedly, however, we have found that we can at least partially reverse the aging process. For example, we found that membranes whose n-butane flux had declined to 51% of its original value during aging could be restored to an n-butane flux that was 84% of the original value. The propane flux of the same membrane, which had deteriorated during aging to 70% of its original value, was 100% restored. Likewise, we have found that we can restore the selectivity for more condensable over less-condensable or non-condensable components, for example n-butane/hydrogen and propane/hydrogen selectivities, to high percentages of, or essentially the same as, their original values.

The reversal of the aging process is achieved by exposing the aged membranes to a vapor that sorbs into the polymer, thereby, we believe, reopening the microvoids that make up the free volume.

It is well known in the art that certain fluids, such as carbon dioxide and organic vapors and liquids, have a tendency to swell and/or plasticize polymer membranes, thereby increasing their permeability to all components. This results in a loss of selectivity, as all permeants are now more easily able to diffuse through the material. Also, as soon as the swelling agent or plasticizer is removed, the membrane reverts to its non-swollen or unplasticized form.

The phenomenon that we have discovered is quite different. Unexpectedly, what we have found is that the selectivity can be substantially restored, rather than further reduced, by exposing the membrane to a sorbable vapor. This result is contrary to what is normally expected. Also, the restorant vapor can be removed and the membrane remains in its reopened form, at least until the gradual aging process has again taken place over a period of weeks, months or years.

This result applies to the selectivity with regard to condensable over less- or non-condensable components. Again without wishing to be bound by any particular theory, we believe this phenomenon occurs because the transport mechanism through glassy, high-free-volume polymers is different from the normal solution/diffusion mechanism of dense polymer films. We believe the material has at least partially passed from being a dense film with a distribution of transient free volume elements to a structure with permanent microvoids in which pore-flow transport can occur. As far as condensable components are concerned, we believe the selectivity for such a component over a less- or non-condensable component, such as a permanent gas, may arise because that component adheres to the surfaces of the microvoids, blocking transport through them of the other component. As the material densities during aging, these voids shrink or close completely, so that this transport mechanism is partly or fully lost. Swelling the material reopens the voids and allows adherence to the microvoid walls and pore-blocking to occur again.

Any material that will sorb into the polymer and reopen the free volume may be used in the restoration process. Preferred restorant materials should be capable of sorbing at least 0.1 g sorbent per gram of polymer, and more preferably at least 0.2 g sorbent per gram of polymer. Of course, the sorption capacity is affected by the conditions under which the sorption is carried out, specifically the sorbent activity and the temperature. It is most preferred if the restorant will sorb at these levels at ambient temperatures and at less than unit activity. However, any materials that will sorb at these levels under some conditions, even at very low temperatures if necessary, meets our definition of a preferred material.

More preferred restorants should also have a small kinetic molecular diameter, such as no greater than about 6Å, because molecules with a small diameter sorb more rapidly throughout the polymer material.

It is also preferred if the restorant is at least moderately volatile, so that it can easily be removed from the polymer after the restoration process is complete. We prefer to use restorants that have boiling points no higher than about 50° C.

Possible representative restorant vapors include, but are not limited to, propane, butane, pentane, methylene chloride, methyl chloride, CFC-12, CFC-113, ammonia and hydrogen sulfide. We prefer to use organic vapors. Particularly preferred are the smaller straight-chain saturated hydrocarbons, such as propane, butane and penlane, which are readily available, which sorb quickly and in large amounts, and which we have found to be effective restorants, even at lower than unit activity. Our most preferred restorants are propane and n-butane.

It is often convenient, although not necessary, to carry out the restoration process using the same vapor as that which the membrane is normally used to separate.

The membrane should be maintained exposed to the restorant for a sufficient time to restore the selectivity to the desired level. Ideally, this is 100% of the pre-aging value. It has been found, however, that it is not always achievable. As shown in the examples below, the selectivity often starts to improve within minutes of exposure to the restorant vapor. After prolonged exposure, the selectivity levels off at a steady-state value beyond which additional exposure produces only very slight or no further improvements in selectivity. Depending on the membranes concerned and the specific selectivity that is being measured, this steady state value may be 100% or less, such as 95%, 90%, 85%, 80% 75%, 70%, or some other fraction of the original value. As a general guideline, we believe the process will be found to be useful, if at least about 70% of the original selectivity can be restored, although lower levels of recovery may be acceptable in some situations. Obviously we prefer higher levels of restoration, such as those listed above, and we believe that these will often be possible by carrying out our teachings.

The restoration is carried out by exposing the membrane to a vapor that will sorb into the membrane and reopen the microvoids that we believe make up the free volume of the polymer. Exposure may be carried out by placing the membrane in a static atmosphere containing the vapor, or by running a flow of vapor across the membrane, or a mixture of both. If the membranes are not housed in modules or mounted in a system, it may be convenient to simply place them in a chamber that contains the restorant vapor. However, most membranes in need of treatment will at least be housed in modules, and many will be mounted in a membrane separation system. In these cases, it is still possible to run vapor into the modules on the feed or permeate sides, or both, then turn off the vapor supply and simply leave the vapor to sorb passively into the membranes. We prefer, however, to run the vapor through the membrane modules continuously with at least a small pressure difference between the feed and permeate sides to facilitate sorption.

It is preferred, although not essential, to carry out the restoration process, whether in a static or flowing environment, with the restorant vapor as close as possible to unit activity. If the activity is substantially less than unity, because the pressure is low or because the vapor is not pure, or both, the properties of the membrane can still be restored, but it will take longer to do so.

In general, the time taken to effect the restoration will depend on the effectiveness of the restorant and the extent to which the membrane has deteriorated. Typically the time to reach a steady state is a few hours, such as no longer than about 15 hours, more preferably no longer than about 12 hours, yet more preferably no longer than about eight hours, and most preferably no longer than about six hours, such as two or four hours. Although it is most convenient to carry out the restoration process at room temperature, restoration may optionally be speeded by lowering the temperature.

The restoration process may be carded out any number of times as needed.

The above discussion stresses restoration of the selectivity of the membranes, because in many cases, loss of selectivity is a more serious problem than loss of permeability. Since many of the membrane materials for which the process of the invention is useful exhibit extremely high permeabilities, some loss of permeability over time may be tolerable. Nevertheless, the process of the invention is also valuable in restoring lost transmembrane flux brought about by a reduction in permeability, as the experiments reported in the Examples section below show. Those of skill in the art will recognize that, depending on the membrane used and the separation to be performed, there may be occasions when loss of flux is actually more detrimental to the overall process performance than loss of selectivity. Our process can then be carried out with the goal of restoring the flux to an acceptable percentage of the original value.

Membranes may take many physical forms, such as unsupported homogeneous films, films supported by a backing material of some kind, asymmetric structures with a graded density from openly microporous on one side to finely microporous or non-porous on the other, composite structures of two or more dissimilar layers, one or more of which contribute to the separation properties, and so on. The processes of the invention are applicable to any membrane form. They are also applicable to the polymer materials themselves.

Likewise, the processes of the invention can be used whether the membranes are formed in sheets, hollow fibers or any other configuration. The processes of the invention can be used on unhoused membranes, or on membranes assembled into hollow-fiber modules, spiral-wound modules, plate-and-frame modules or any other arrangement.

(b) Maintenance of selectivity

In its second aspect, our inventions concerns maintaining the permeation properties, particularly the selectivity, of membranes. Wherever possible, it is clearly desirable to maintain the membrane properties, rather than having to restore them as described above.

Membrane aging typically takes place in two circumstances, (i) when the membrane modules have been manufactured and are in storage prior to sale or use, and (ii) when the membrane modules are installed in a separation system, but the system is not in continuous operation. In both of these situations, and any others that may arise, we have found that it is possible to reduce or avoid aging.

In keeping with the results available in the prior art, we found that membranes suffer gradual aging when left in air, in other permanent gases or under vacuum for a length of time such as weeks, months or years.

We found, however, that aging could be substantially avoided if the membranes were kept under continuous exposure to a vapor meeting the sorption criteria set forth in section (a) above. This effect was observed even at relatively low vapor activities. For example, a mixture of 2% n-butane in hydrogen at 100 psig has an n-butane activity of 0.07. This mixture was found adequate to sustain the permeability of a PTMSP membrane at 75% (for n-butane) and 85% (for hydrogen) of its original value and the n-butane/hydrogen selectivity at 88% of its original value. Most of the loss in permeability and selectivity occurred over the first 10 days of maintenance; thereafter the values remained essentially unchanged.

As stated above, for the maintenance process to be effective, the vapor activity need not be high. It is preferred that the activity be at least about 0.01, more preferably at least about 0.1, and most preferably unity or close to unity. The most preferred hydrocarbon vapors, propane and n-butane, have saturation vapor pressures at room temperature of 150 psia and 32 psia respectively. Thus an activity of 0.1 can be achieved with pure propane at 15 psia, with 50% propane/nitrogen at 30 psia or with 10% n-butane in nitrogen at 32 psia, for example.

As with the restoration procedures described above, the maintenance processes of our invention can be carded out on membranes or membrane modules that are in storage or in intermittent use. The procedures for bringing the membranes into contact with a suitable vapor are also as generally described above. If the modules are installed in a membrane separation system, it is preferred that, whenever the system is not in use for active separation, the system is run with a flow of pure vapor or a vapor-containing mixture. Alternatively, the system may simply be loaded with pure vapor or a vapor-containing mixture and then closed off, so that the membranes remain in contact with the vapor during the inactive period.

It is convenient, but not necessary, that the vapor used in the maintenance process is the same as one component of the gas mixture that the system is normally used to separate. If a different vapor is used during the maintenance process, it is desirable to purge the system with the gas mixture to be treated before beginning active separation again.

If the modules to be maintained are in storage, it is more difficult to continuously run a flow of vapor through them. The preferred maintenance procedure for stored modules is to fill them with vapor or a vapor-containing mixture, then seal all inlet and outlet ports. When the modules are required for use, the ports are opened, the modules are mounted in the separation system and purged before starting active separation. Alternatively, the modules can be placed in a storage vessel that contains the vapor.

The normal lifetime of a membrane module can be anything from a few weeks to five years or more, depending on the membrane type and the harshness of the environment in which it is used. By following the teachings herein, we believe that it is possible to maintain membranes that would otherwise deteriorate through physical aging in a satisfactory condition, such as having a selectivity at least about 70% of the original selectivity, for a period of at least six months.

As with the restoration process, the maintenance processes of the invention are applicable to all types of membranes and membrane modules.

The processes of the invention are applicable in a diversity of gas-separation arenas. By way of non-limiting example, these arenas include treatment of gas streams containing organic vapors, such as aliphatic hydrocarbons, aromatic hydrocarbons, or halogenated hydrocarbons, in air or nitrogen, and treatment of gas streams containing organic compounds in other gases, such as streams that arise from chemical and petrochemical processing, and natural gas treatment.

The numerical value of original selectivity that it is desired to maintain or restore will vary depending on the separation that the membrane is normally used to perform. Typical values might be 5, 10, 20, 50 or 100.

The invention is now further illustrated by the following examples, which are intended to be illustrative of the best mode of carrying out the invention, but are not intended to limit the scope or underlying principles of the invention in any way.

EXAMPLES

The examples are in five sets. Set 1 shows experimental data for representative unaged, original selectivity and flux. Set 2 concerns membrane aging. Set 3 shows some typical sorption measurements. Set 4 provides specific examples of the restoration process. Set 5 provides specific examples of the maintenance process.

SET 1 Representative Original Selectivity

Example 1 Preparation of Isotropic PTMSP Films

Films of PTMSP were prepared by hand-casting. A 2-wt % or 5-wt % polymer solution in toluene was cast onto clean glass plates with a casting bar. After evaporation of the solvent, the films were removed from the glass plate by immersion in water and were dried in a vacuum oven at 60°–70° C. The thickness of the films was determined by measurement with a precision micrometer. The average thickness of the films ranged from 15 to 200 (±0.5) μm.

Example 2 Measurements of Representative Original Flux and Selectivity Values

PTMSP films of thickness 48 μm and 200 μm were hand-cast from a solution of 5 wt % PTMSP in toluene onto glass plates. Integrity and permeation tests were conducted with 12.6-cm² stamps in a permeation test-cell apparatus. The gas mixture used for the permeation tests consisted of 86% methane, 10% ethane, 3% propane and 1% n-butane. The feed pressure was varied from 300 psig to 950 psig, and the permeate side of the membrane was at atmospheric pressure.

Gas flow rates were determined with soap-film flowmeters. The upstream and the downstream sides of the permeation cell were purged with the test gas prior to starting each gas permeation experiment. The compositions of the feed, residue, and permeate gases were measured with an on-line gas chromatograph equipped with a TCD (Thermal Conductivity Detector) and an 8-foot-long Haysep Q, 80/100 mesh column at 130° C.

Tables 1 and 2 show representative permeation results for the two films at different feed pressures.

TABLE 1

Permeation Properties of 48 μm PTMSP Film at Different Feed Pressures

| Feed pressure (psig) | Pressure-normalized flux (× $10^{-5}$ cm³(STP)/ cm² · s · cmHg) | | | Selectivity | |
|---|---|---|---|---|---|
| | Methane | Propane | Butane | Propane/methane | Butane/methane |
| 300 | 4.8 | 42 | 150 | 8.8 | 31 |
| 500 | 5.5 | 41 | 110 | 7.5 | 20 |
| 600 | 6.1 | 42 | 96 | 6.9 | 16 |
| 800 | 5.8 | 35 | 72 | 6.0 | 12 |
| 950 | 5.9 | 32 | 61 | 5.4 | 10 |

TABLE 2

Permeation Properties of 200 μm PTMSP Film at Different Feed Pressures

| Feed pressure (psig) | Pressure-normalized flux (× $10^{-5}$ cm³(STP)/ cm² · s · cmHg) | | | Selectivity | |
|---|---|---|---|---|---|
| | Methane | Propane | Butane | Propane/methane | Butane/methane |
| 300 | 1.1 | 10 | 50 | 9.1 | 45 |
| 500 | 1.1 | 9.9 | 36 | 9.0 | 33 |
| 600 | 1.2 | 9.9 | 31 | 8.2 | 26 |
| 800 | 1.4 | 9.5 | 26 | 6.8 | 19 |
| 950 | 1.5 | 9.5 | 24 | 6.3 | 16 |

SET 2 Membrane Aging

Example 3

PTMSP composite membranes were prepared by hand-casting. A 500-μm-thick layer of a 5-wt % solution of PTMSP in toluene was cast directly onto a high-flux, microporous polyvinylidene fluoride support membrane with a casting bar. After evaporation of the solvent, the membrane was dried thoroughly in a vacuum oven at 80° C. The mixed-gas permeation properties of 36.3-cm² membrane stamps were monitored periodically over a 97-week period. A membrane sample was tested in a permeation test-cell apparatus with a mixture of 86% methane, 10% ethane, 3% propane, 1% n-butane at 500 psig feed pressure and 0 psig permeate pressure. Between test periods, the samples were stored in a closed, opaque container.

The results are presented in Table 3. Over the 97-week test period, the mixture methane flux decreased from 78×$10^{-6}$ cm³/cm²·s·cmHg to 20×$10^{-6}$ cm³/cm²·s·cmHg, or 26% of the original value. The propane flux decreased from 520× $10^{-6}$ cm³/cm²·s·cmHg to 86×$10^{-6}$ cm³/cm²·s·cmHg, or 16% of the original value. The n-butane flux decreased from 1,200×$10^{-6}$ cm³/cm²·s·cmHg to 190×$10^{-6}$ cm³/cm²·s·cmHg, also 16% of the original value. As a result of the decreases in flux, the propane/methane and n-butane/methane selectivities both decreased to approximately 64% of their initial values.

TABLE 3

Mixed-Gas Permeation Properties of PTMSP Membrane as a Function of Membrane Age.

| Age of Membrane | | Gas Mixture Pressure-Normalized Flux ($10^{-6}$ cm³(STP)/ cm² · s · cmHg) | | | Mixed Gas Selectivity (–) | |
|---|---|---|---|---|---|---|
| Days | Weeks | CH₄ | C₃H₈ | n-C₄H₁₀ | C₃H₈/CH₄ | n-C₄H₁₀/CH₄ |
| 0 | 0 | 78 | 520 | 1,200 | 6.7 | 15 |
| 4 | 0.6 | 67 | 430 | 990 | 6.4 | 15 |
| 29 | 4.1 | 53 | 330 | 660 | 6.2 | 12 |
| 50 | 7.1 | 44 | 260 | 630 | 5.9 | 14 |
| 85 | 12.1 | 38 | 200 | 510 | 5.3 | 13 |
| 161 | 23.0 | 26 | 120 | 290 | 4.6 | 11 |
| 678 | 96.9 | 20 | 86 | 190 | 4.3 | 9.5 |

Example 4

Figure 2:
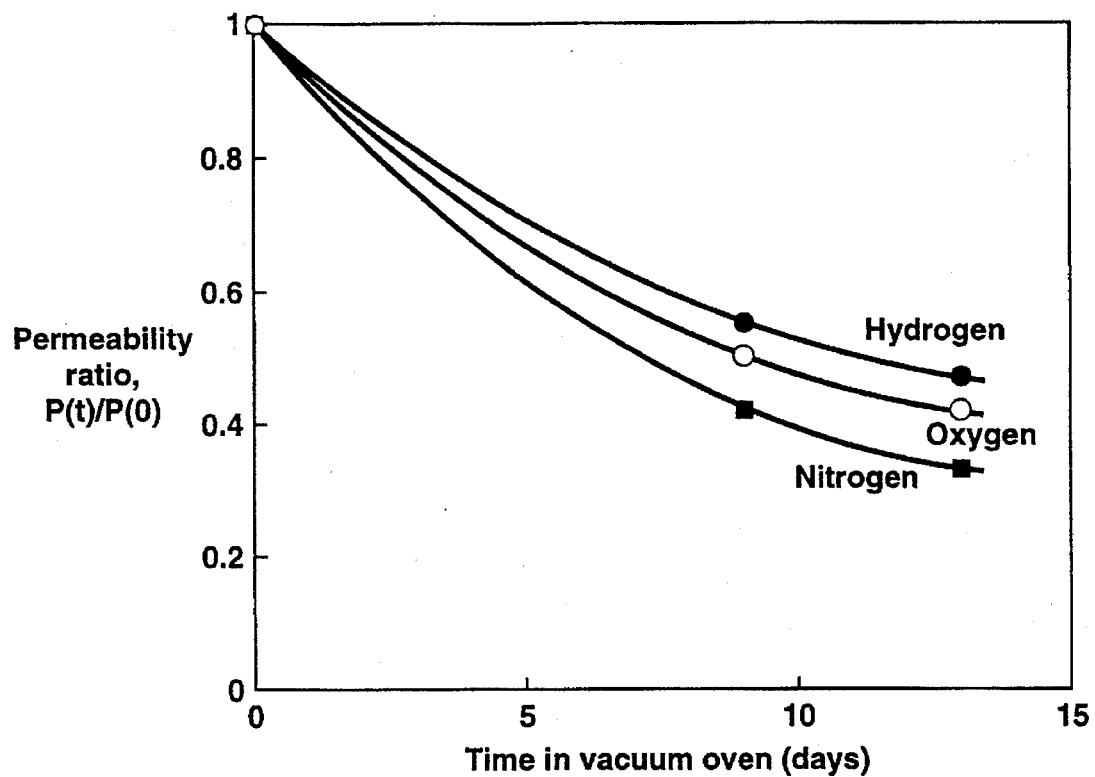
FIG. 2 is a graph of the permeability ratio (loss of permeability) for hydrogen, oxygen, and nitrogen as a function of aging time.

A PTMSP film was prepared using the same general technique as in Example 1. The resultant film was 16 μm thick. A stamp with an area of 12.6 cm² was cut out and subjected to gas permeation tests following the general procedure as described in Example 2. The PTMSP film was aged in a vacuum oven at 130° C. and 20 torr; FIG. 2 shows the loss in hydrogen, oxygen and nitrogen permeability as a function of time in the vacuum oven. P(o) is the original, unaged permeability; P(t) is the aged permeability after time t. The decrease in permeability is much more rapid under these conditions than in the aging experiments of Example 3.

Figure 3:
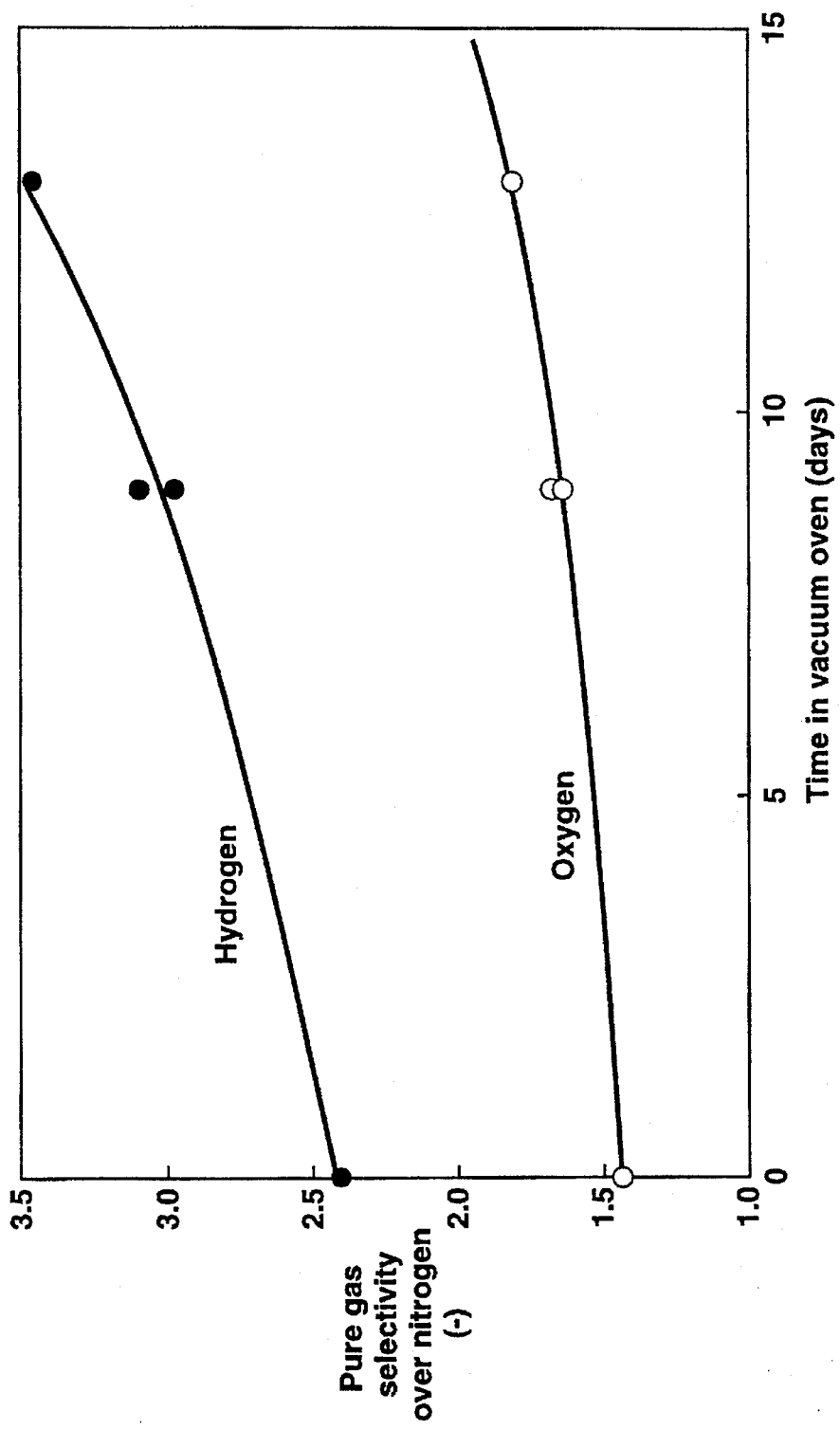
FIG. 3 is a graph of the pure-gas selectivities of oxygen and hydrogen over nitrogen as a function of aging time.

FIG. 3 shows the increase in the pure-gas selectivities for oxygen and hydrogen over nitrogen that accompany the aging process. This increase occurs because, as the free volume of PTMSP collapses, the steric hindrance to diffusion of the larger species, nitrogen, is more significant.

SET 3 Sorption Measurements

Example 5 Sorption of Propane

Figure 4:
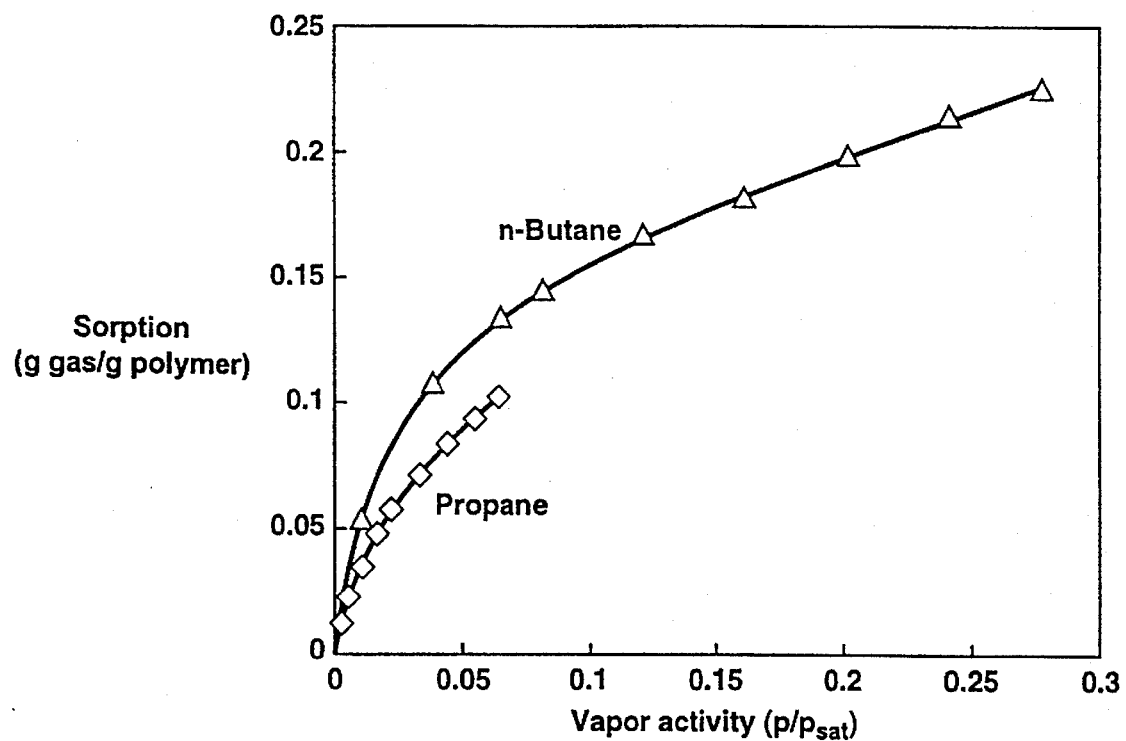
FIG. 4 is a graph of the sorption of propane and n-butane as a function of propane and n-butane activity.

The sorption of propane in PTMSP was determined gravimetrically at 35° C. using a Cahn RG-2000 electrobalance enclosed in a glass sorption chamber. A powdered polymer sample was suspended from the electrobalance by a pan, and the sorption chamber was evacuated for at least 24 hours. The test gas was then introduced at a fixed pressure, and the increase in sample weight was recorded as a function of time using a strip-chart recorder. When the sample weight had been constant for several hours, the gas pressure in the sorption chamber was increased to begin the next experiment. The weight uptake data were corrected for the effect of buoyancy by performing a blank run without polymer in the sample pan of the balance. From these data, the sorption of propane as function of activity was determined; results are shown in FIG. 4.

Example 6 Sorption of n-Butane

The sorption of n-butane in PTMSP was determined using the same method as described in Example 5. The results are shown in FIG. 4.

The results from Examples 5 and 6 show that PTMSP follows the typical sorption behavior of gases in glassy polymers, and that, as expected, n-butane is sorbed more strongly than propane. The results show that adequate sorption to meet the requirements of our invention can be achieved with these hydrocarbons, even at low activities.

SET 4 Restoration of Membrane Selectivity

Example 7 Restoration Treatment of a Two-Year-Old Membrane

At the end of the aging study, the aged PTMSP membrane of Example 3 was exposed to a saturated mixture of n-hexane in nitrogen by running the gas mixture through a test cell containing the membrane overnight at a pressure of 100 psig. This exposure time was enough to ensure that the polymer had reached an equilibrium degree of swelling. The membrane was then retested with a gas mixture (86% methane, 10% ethane, 3% propane, 1% n-butane) at 500 psig feed pressure and 0 psig permeate pressure. The propane/methane selectivity was 5.6 and the n-butane/methane selectivity was 12. Thus, the propane/methane selectivity was restored to 84% of its original value (6.7), and the n-butane/methane selectivity to 80% of its original value (15).

Example 8 Restoration by n-Butane Treatment

Figure 5:
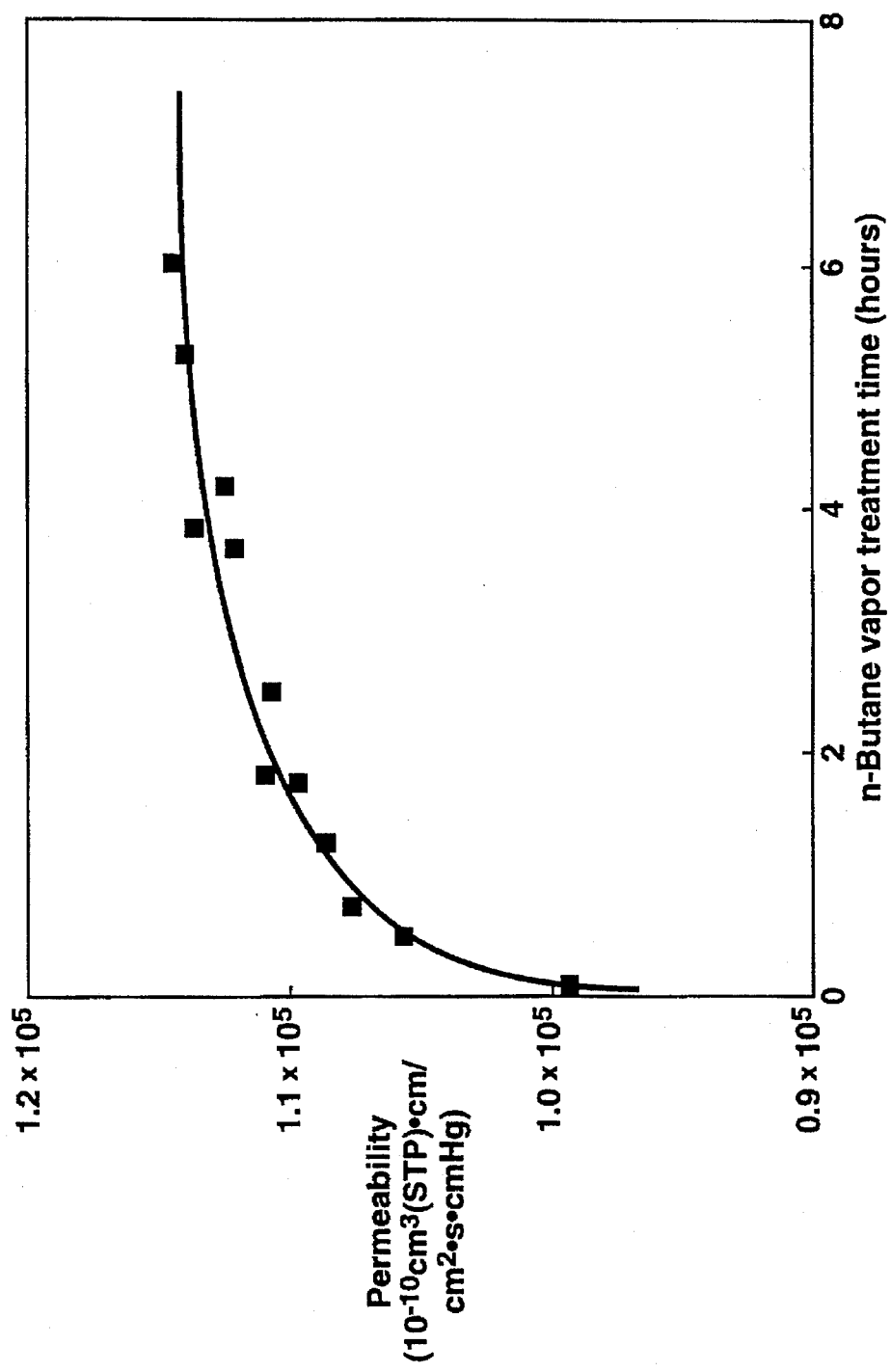
FIG. 5 is a graph of pure-gas n-butane permeability as a function of n-butane treatment time.
Figure 6:
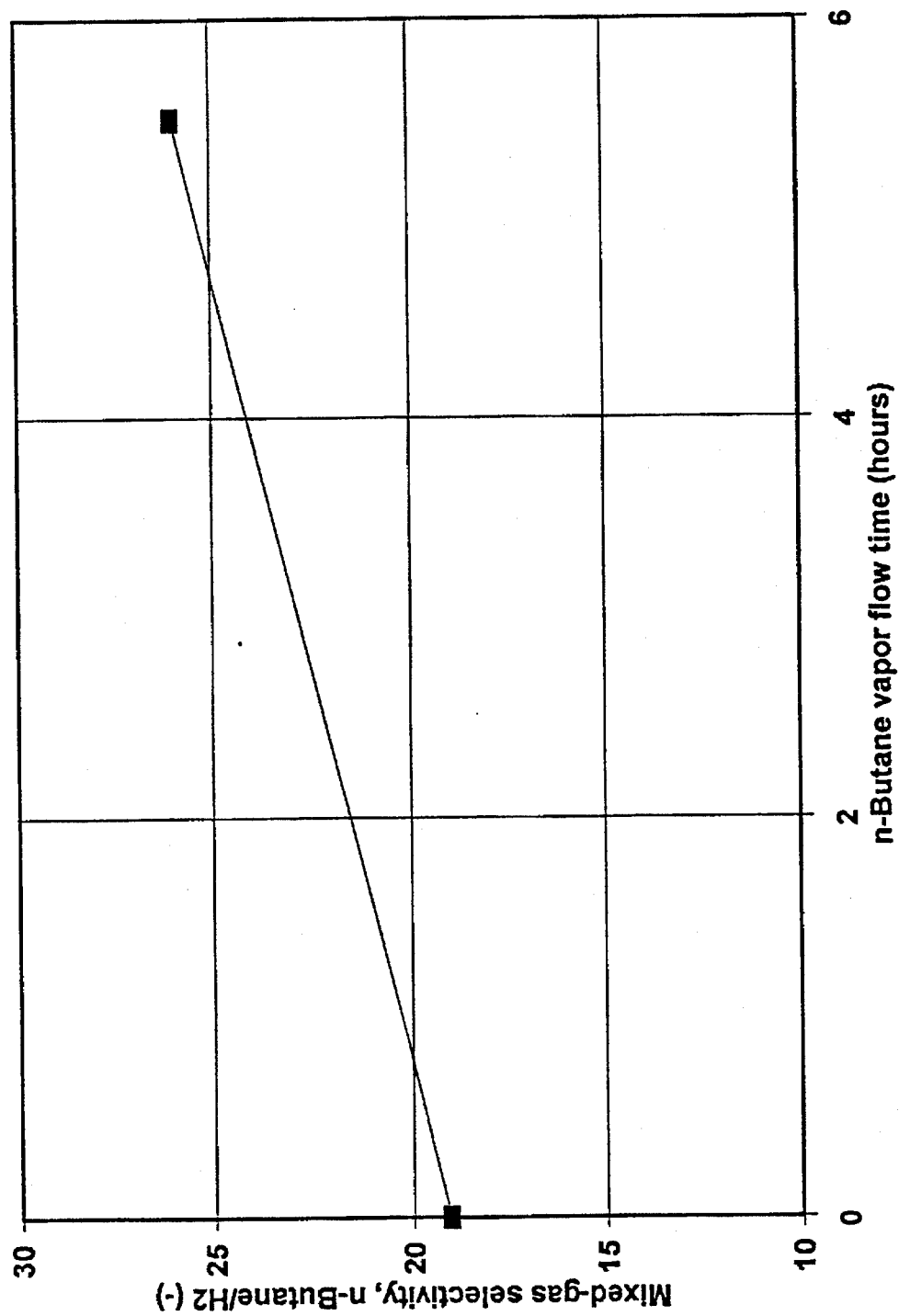
FIG. 6 is a graph n-butane/hydrogen mixed-gas selectivity as a function of n-butane treatment time.

An aged PTMSP film from Example 4 was treated with pure n-butane for six hours by passing the gas through a permeation cell at unit activity (32 psia) at the feed side and at atmospheric pressure on the permeate side. After treatment, the permeation properties were measured using a 2% n-butane/98% hydrogen gas mixture, at 215 psia feed pressure, 14.7 psia permeate pressure, and 25° C. temperature. FIG. 5 shows the increase in the n-butane permeability observed during the course of the six-hour vapor treatment. The n-butane permeability increases very rapidly in the first two hours and reaches a steady state after six hours of $110,000 \times 10^{-10}$ cm$^3$(STP)·cm/cm$^2$·s·cmHg, which is essentially equal to the n-butane permeability of non-aged PTMSP. FIG. 6 shows the n-butane/hydrogen selectivity, which increased from an aged value of about 19 to a restored value of about 26.

Example 9 Restoration by Propane Treatment

An aged PTMSP film from Example 4 was treated with pure propane for two hours by passing the gas through a permeation cell at unit activity (150 psia) at the feed side and at atmospheric pressure on the permeate side. The vapor treatment was interrupted periodically for a 98% hydrogen/2% n-butane mixed-gas test at 200 psig. After two hours, the n-butane permeability had increased from $30,000 \times 10^{-10}$ cm$^3$(STP)·cm/cm$^2$·s·cmHg to $43,000 \times 10^{-10}$ cm$^3$(STP)·cm/cm$^2$·cs·mHg. FIG. 1 shows the n-butane/hydrogen selectivity, which increased from an aged value of about 27 to level-off at about 36, which was essentially the same as the original, unaged value.

SET 5 Maintenance of Membrane Selectivity

Example 10

Two PTMSP films were prepared using the same general technique as in Example 1. The resultant films were 14 gm thick and 32 82 m thick. Stamps with an area of 12.6 cm$^2$ were cut out and subjected to gas permeation tests following the general procedure as described in Example 2. The 32-μm-thick stamp was continuously exposed to 100 psig of a 2 vol % n-butane/98 vol % hydrogen gas mixture. The feed pressure was 215 psia, the permeate pressure was atmospheric, and the temperature was 25° C. The mixed-gas permeation properties of the film were measured daily for a total of 47 days.

The 14-μm-thick stamp was continuously exposed to pure hydrogen, and the pure-gas hydrogen permeability was monitored for comparison. The feed pressure was 64.7 psia, the permeate pressure was atmospheric, and the temperature was 25° C.

Figure 7:
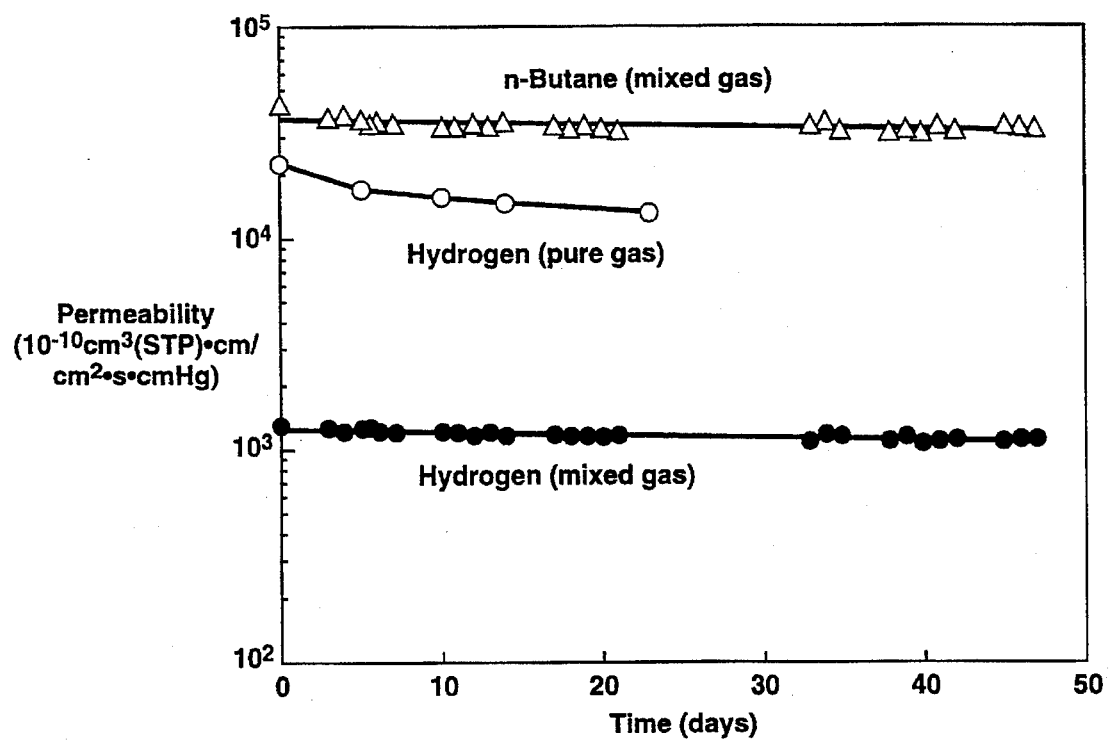
FIG. 7 is a graph of mixed-gas n-butane and hydrogen permeabilities as a function of maintenance time in a 2-vol % n-butane/hydrogen atmosphere.

FIG. 7 shows the mixed-gas n-butane and hydrogen permeabilities as a function of time; the pure hydrogen permeability is included as a reference. The mixed-gas n-butane permeability of the 32-μm PTMSP film decreased from $4.3 \times 10^{-6}$ cm$^3$(STP)·cm/cm$^2$·s·cmHg to $3.2 \times 10^{-6}$ cm$^3$(STP)·cm/cm$^2$·s·cmHg; the hydrogen permeability decreased from $1.3 \times 10^{-6}$ cm$^3$(STP)·cm/cm$^2$·s·cmHg to $1.1 \times 10^{-6}$ cm$^3$(STP)·cm/cm$^2$·s·cmHg. The stabilized permeabilities are roughly 75% and 85%, respectively, of their original values. In contrast, the pure hydrogen permeability dropped to 60% (from $2.3 \times 10^{-6}$ cm$^3$(STP)·cm/cm$^2$·s·cmHg to $1.4 \times 10^{-6}$ cm$^3$(STP)·cm/cm$^2$·s·cmHg) in 20 days and continued to decrease. Thus, the presence of n-butane stabilizes the hydrogen permeability.

Figure 8:
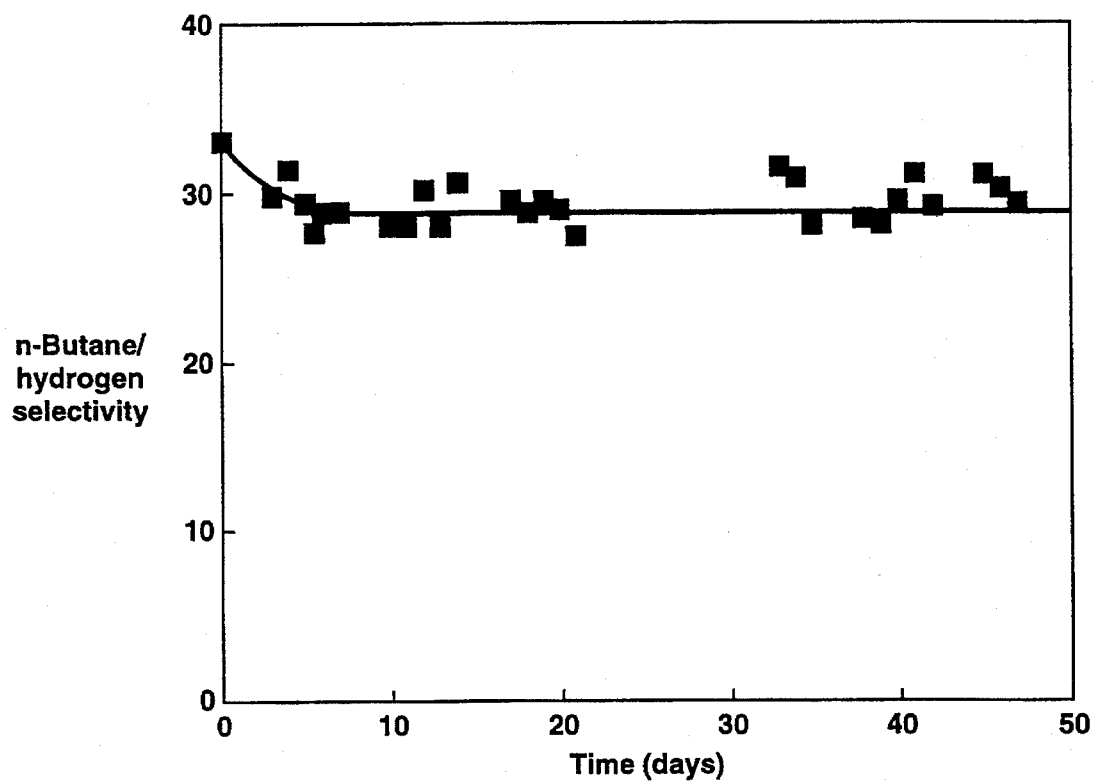
FIG. 8 is a graph of mixed-gas n-butane and hydrogen selectivity as a function of maintenance time in a 2-vol % n-butane/hydrogen atmosphere.

The mixed-gas n-butane/hydrogen selectivity of the 32-μm PTMSP film exposed to the n-butane/hydrogen mixture is plotted in FIG. 8. The selectivity was essentially stable for the entire 47-day test period at a value of 29, or 88% of the initial value of 33.

We claim:

1. A process for at least partially restoring an original selectivity of a condensable component over another component of a gas stream, in a membrane in which said original selectivity has deteriorated, said membrane comprising a polymer characterized by a glass transition temperature $T_g$ of at least about 100 ° C. and a free volume $V_F$ of at least about 15%, said process comprising exposing said membrane to a vapor having a sorption capacity of at least about 0.1 g of said vapor per gram of said polymer and a kinetic molecular diameter of less than about 6Å.

2. The process of claim 1, wherein said vapor comprises an organic vapor.

3. The process of claim 1, wherein said vapor comprises a hydrocarbon vapor.

4. The process of claim 1, wherein said vapor comprises a vapor selected from the groupconsisting of propane, butane, and pentane.

5. The process of claim 1, wherein said sorption capacity is at least about 0.2 g of said vapor per gram of said polymer.

6. The process of claim 1, wherein said vapor has a boiling point no higher than about 50° C.

7. The process of claim 1, wherein at least 70% of said original selectivity is restored.

8. The process of claim 1, wherein at least 80%, of said original selectivity is restored.

9. The process of claim 1, wherein at least 95% of said original selectivity is restored.

10. The process of claim 1, wherein said free volume $V_F$ is at least about 20%.

11. The process of claim 1, wherein said polymer is a substituted polyacetylene.

12. The process of claim 1, wherein said polymer is polytrimethylsilylpropyne.

13. The process of claim 1, wherein said condensable component comprises an organic vapor.

14. The process of claim 1, wherein said gas stream comprises natural gas.

15. The process of claim 1, wherein said original selectivity is at least 10.

16. A process for at least partially maintaining an original selectivity of a condensable component over another component of a gas stream, in a membrane in which said selectivity is known to deteriorate over time, said membrane comprising a polymer characterized by a glass transition temperature $T_g$ of at least about 100° C. and a free volume $V_F$ of at least about 15%, said process comprising maintaining said membrane in an atmosphere comprising a vapor having a sorption capacity of at least about 0.1 g of said vapor per gram of said polymer and a kinetic molecular diameter of less than about 6Å.

17. The process of claim 16, wherein said vapor comprises an organic vapor.

18. The process of claim 16, wherein said vapor comprises a hydrocarbon vapor.

19. The process of claim 16, wherein said vapor comprises a vapor selected from the group consisting of propane, butane, and pentane.

20. The process of claim 16, wherein said sorption capacity is at least about 0.2 g of said vapor per gram of said polymer at a vapor activity.

21. The process of claim 16, wherein said vapor has a boiling point no higher than about 50° C.

22. The process of claim 16, wherein at least 70% of said original selectivity of the membrane is maintained.

23. The process of claim 16, wherein at least 80% of said original selectivity of the membrane is maintained.

24. The process of claim 16, wherein at least 95% of said original selectivity of the membrane is maintained.

25. The process of claim 16, wherein said free volume $V_F$ is at least about 20%.

26. The process of claim 16, wherein said polymer is a substituted polyacetylene.

27. The process of claim 16, wherein said polymer is polytrimethylsilylpropyne.

28. The process of claim 16, wherein said condensable component comprises an organic vapor.

29. The process of claim 16, wherein said gas stream comprises natural gas.

30. The process of claim 16, wherein said original selectivity is at least 10.

31. The process of claim 22, wherein said at least 70% of said original selectivity is maintained for at least six months.

32. The process of claim 16, wherein said membrane is in storage.

33. The process of claim 16, wherein said membrane is installed in an idle separation system.

* * * * *